United States Patent [19]

DeRouen et al.

[11] 4,132,385
[45] Jan. 2, 1979

[54] CAM-LOCK WATER GATE

[75] Inventors: Rodney P. DeRouen; Timothy Smith, both of Eunice, La.

[73] Assignee: Coastal Culvert & Supply, Inc., Eunice, La.

[21] Appl. No.: 771,367

[22] Filed: Feb. 23, 1977

[51] Int. Cl.$^2$ .......................... F16K 3/18; F16K 39/04
[52] U.S. Cl. ................................... 251/147; 251/187; 251/204; 251/326
[58] Field of Search ............... 251/204, 203, 147, 326, 251/268, 187

[56] References Cited

U.S. PATENT DOCUMENTS

| | | | |
|---|---|---|---|
| 709,102 | 9/1902 | Martin et al. | 251/204 X |
| 957,448 | 5/1910 | Taylor | 251/147 X |
| 976,720 | 11/1910 | Buttorff | 251/147 X |
| 1,301,030 | 4/1919 | Benner | 251/204 |
| 1,654,476 | 12/1927 | Amend | 251/147 |
| 2,652,946 | 9/1953 | Beatty | 251/187 X |
| 3,351,317 | 11/1967 | Rothenberger | 251/204 X |
| 3,586,019 | 6/1971 | Thomas et al. | 251/268 X |

*Primary Examiner*—Arnold Rosenthal
*Attorney, Agent, or Firm*—Clarence A. O'Brien; Harvey B. Jacobson

[57] ABSTRACT

A cam-lock water gate designed to control water flow from a pond, lake, field, canal or the like. A primary body member is provided with an aperture therethrough and a short section of pipe stub integral with the main body member and opening into said aperture. An adjustable gate plate is mounted on said main body member and constrained between parallel guide channels to permit the gate to be adjusted for completely opening the aperture, partially opening the aperture, or completely closing the aperture. A regular duty embodiment employs a simple handle and rod control for both adjusting the gate plate as well as locking the cam-lock mechanism to positively retain the gate plate in the set position once adjusted. Another heavy duty embodiment employs heavier materials and heavier construction of the device and also incorporates a security lock bar that enables the gate plate to be locked to prevent unauthorized adjustment thereof. Another embodiment employs a threaded rod with adjusting nut operated by a wheel type control. A modified cam-lock mechanism is also incorporated for locking the gate plate in adjusted position. Rustproof and corrosion resistant materials are used for construction throughout all of the embodiments. Because of the lightweight construction employed all of the devices may be installed without the use of heavy equipment for most installations.

8 Claims, 12 Drawing Figures

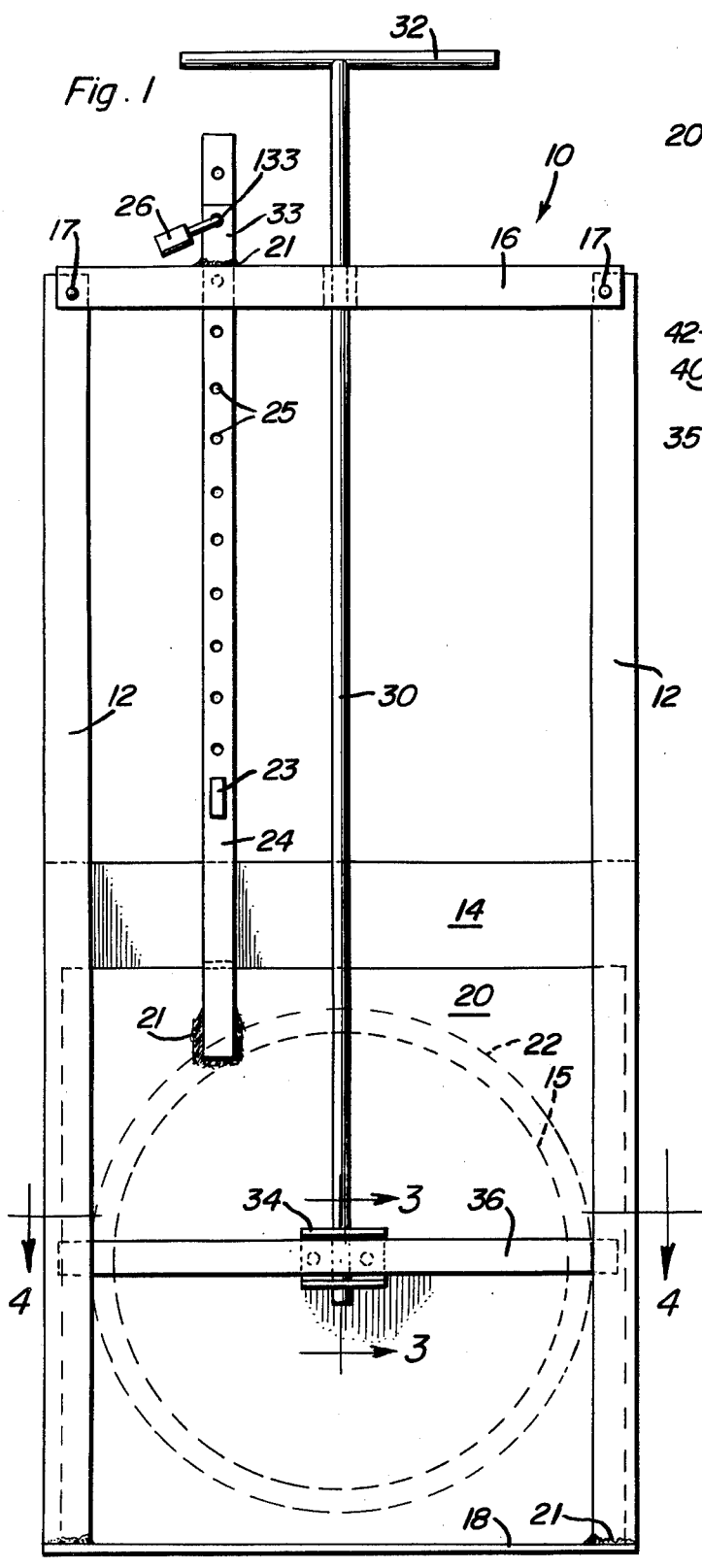
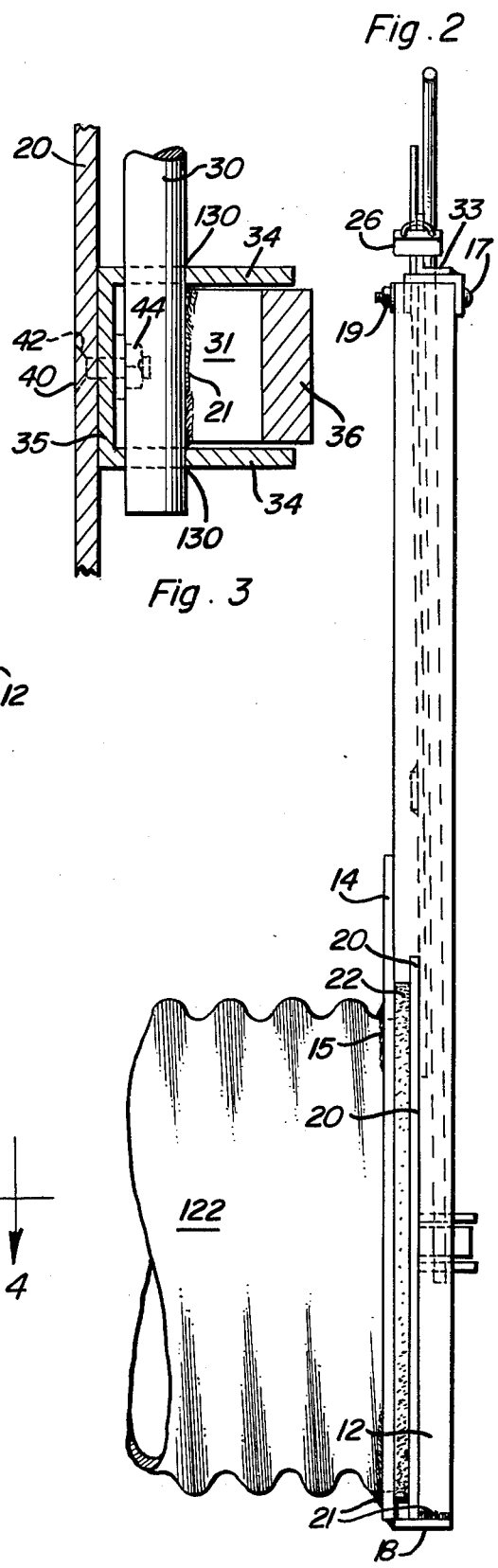

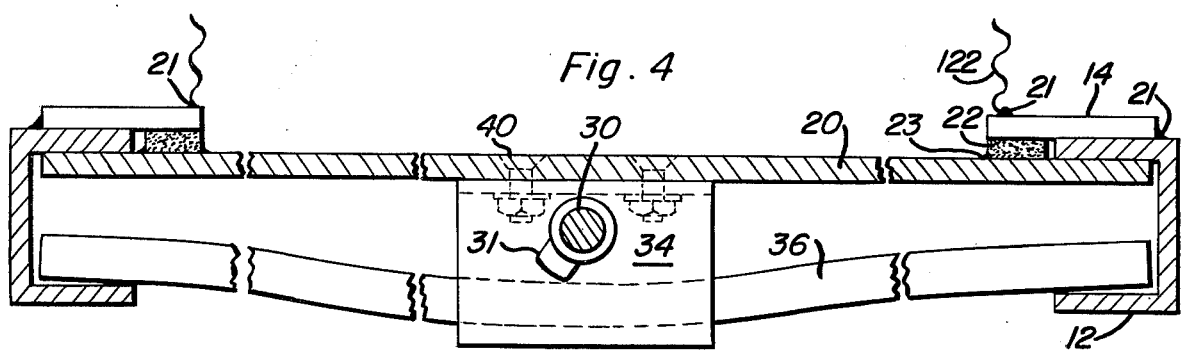
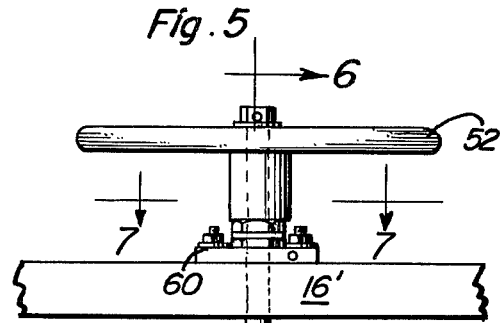
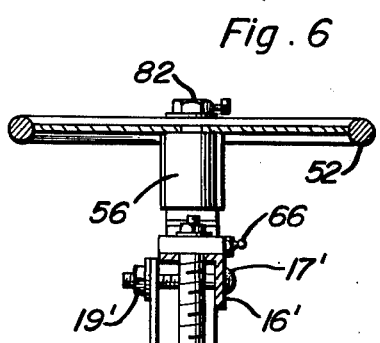
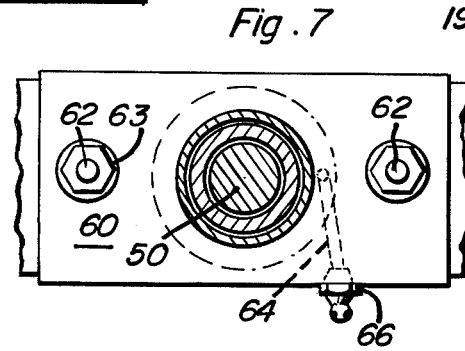
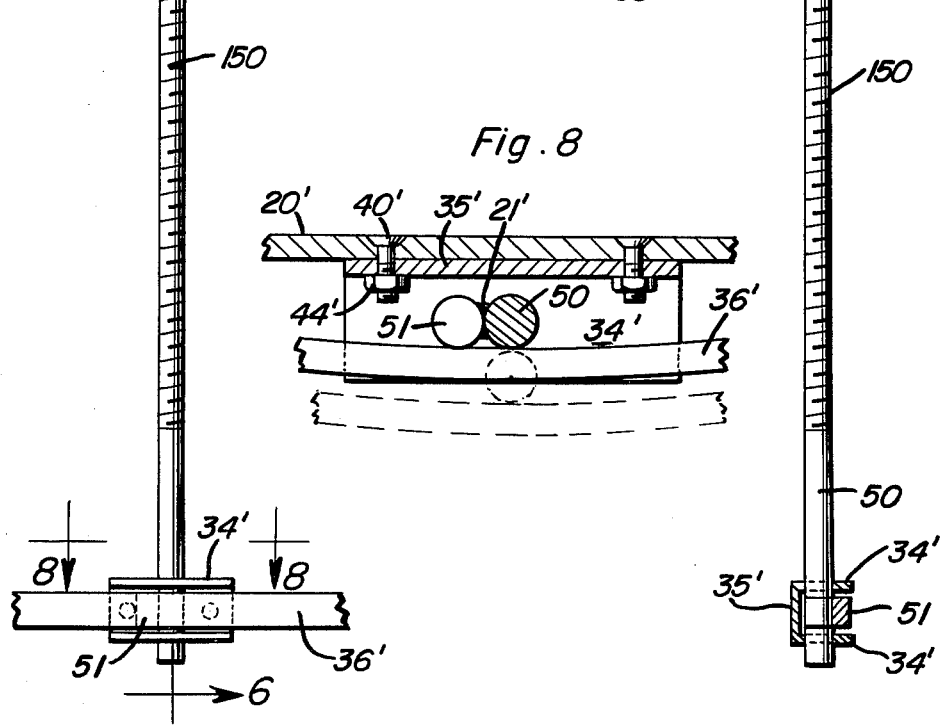

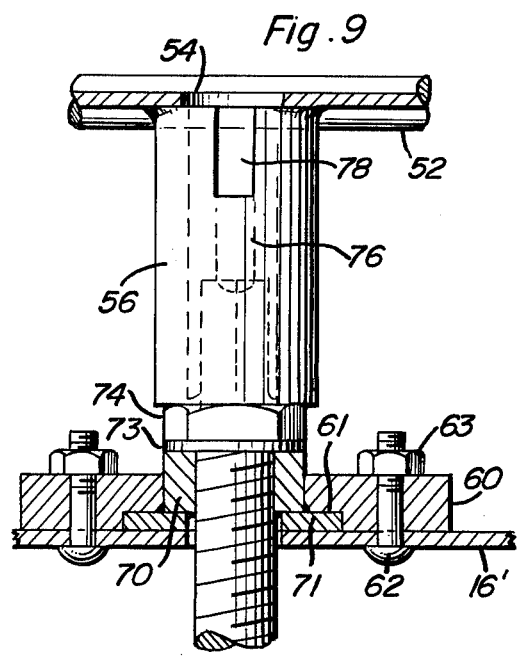
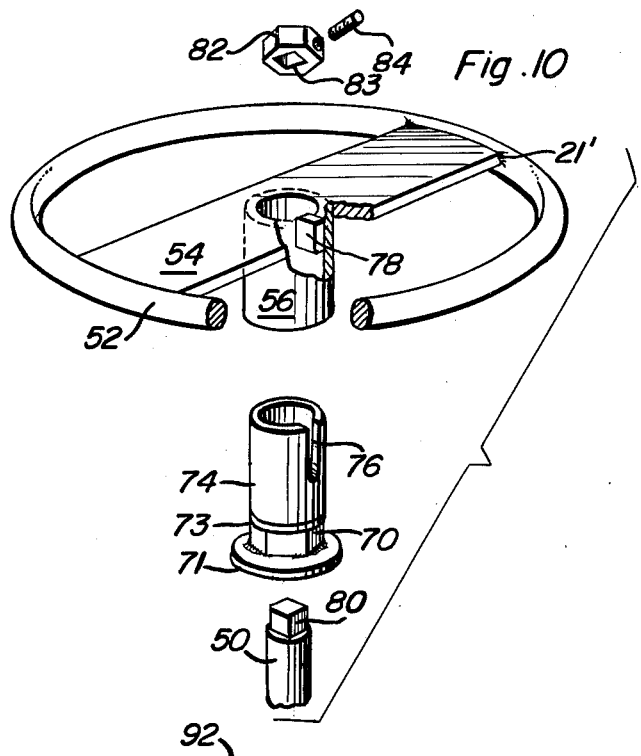
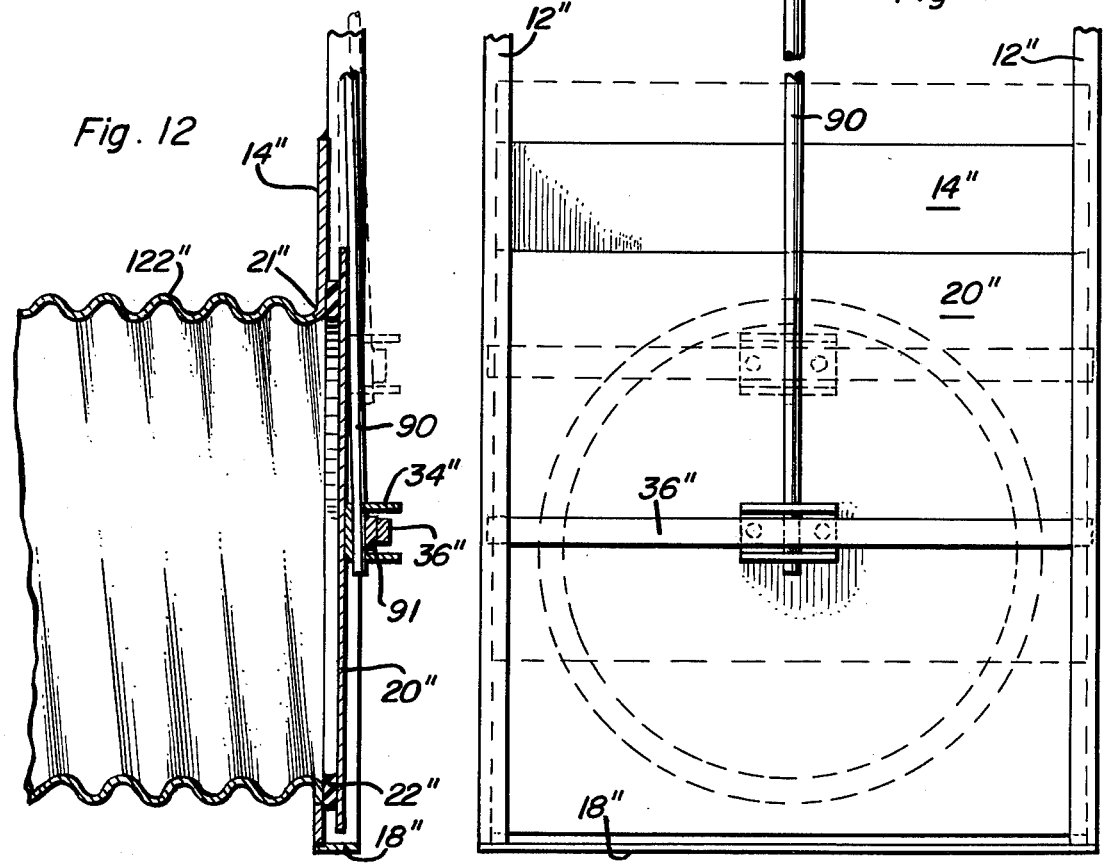

CAM-LOCK WATER GATE

BACKGROUND OF THE INVENTION

1. Field of the Invention

This invention relates generally to devices for controlling the flow of water from ponds, lakes, fields, canals and the like wherein there is a head of water pressure exerted against the control structure.

2. Description of the Prior Art

A common problem with known type devices for controlling water flow against a head pressure is that such structures are not easily adjustable, and often times are difficult to lock or retain in adjusted position in a positive secure manner.

Another problem with known type devices is that the moving and actuating adjusting gate structure is not designed to be easily replaced separate from the remaining installation structure. Thus, with such arrangements the entire structure must be replaced rather than just the minimum worn portions.

Known prior art patents which may be pertinent to this invention are as follows: U.S. Pat. Nos. 894,240, A. A. Taylor, July 28, 1908; 989,202, F. P. Snow, Apr. 11, 1911; 1,161,997, H. E. Thompson, Nov. 30, 1915; 1,592,986, G. C. Martin, July 20, 1926; 2,751,858, C. J. Koranda et al, June 26, 1956; 2,813,694, O. B. Harmes et al, Nov. 19, 1957; 3,264,829, F. P. Broussard, Aug. 9, 1966.

None of these known prior art devices offers the new and unique features of the invention disclosed herein.

SUMMARY OF THE INVENTION

An object of the present invention is to provide a water gate for controlling the flow of water under pressure and for the purpose of controlling relatively large quantities of water flow.

Another object of the present invention is to provide a cam-lock water gate which is mounted in a special aluminum alloy frame with the frame structure being designed for permanent installation in a water flow path with the adjustable portions of the water gate being easily replaceable when necessary. A high quality gasket is securely fastened to the back of the gate plate to insure a watertight seal when the cam-lock mechanism associated with the device is activated to lock the gate plate in position as adjusted.

A further object of this invention is to provide a slide gate plate which is freely movable within aligned channels in the basic structure to permit free and easy adjustment of the gate plate and yet positive positioning and alignment thereof relative to the path of water flow.

A still further object of this invention is to provide a hand operated mechanism for controlling the cam-lock mechanism of the water gate adjusting plate together with various modifications for effecting this control.

An additional object of this invention is to provide a security lock structure associated with the slidable water gate so that the overall structure may be locked against unauthorized adjustment thereof.

The cam-lock water gate structure of this invention has a number of new and unique features. The structure can be operated manually by the simple maneuver of turning a handle to release the cam-lock device thus allowing the raising or lowering of the gate slide plate to the desired height in order to regulate water flow. The entire gate structure is preferably rustproof and corrosion resistant because of being made of marine alloy aluminum and stainless steel. It is very light in weight and therefore portable for ease in field installations without the use of heavy equipment. It is easily and quickly disassembled after it has been installed in the field for replacement of parts which wear and/or in the event of damage to the cam-locking or slide portion of the device. One need only remove two bolts on the top of the structure is order to remove the entire movable and workable water gate mechanism. Thus, the damaged mechanism may be quickly repaired, or even replaced with a similar unit with a minimum of shut-down time for the installation.

Special aluminum alloy is used for the frame, back and slide plates together with stainless steel bolts, washers and nuts being used to secure these parts together. The hand operated cam-lock mechanism insures a constant pressure action of the slide plate against the back plate. A high quality resilient rubber gasket is pressure glued to the back of the gate plate in order to insure a watertight seal with the back plate when the cam-lock is activated. All of the moving parts can easily be changed without removing the basic structure from its installation site.

The slide gate plate can be lifted to any desired height and kept in place by activating the cam-lock device. The standard gate comes with a aluminum pipe stub of either annular or helical corrugation attached integrally to the back plate in line with a water flow aperture therein. The regular duty model is available in pipe sizes from 6 inches through 24 inches.

A heavy duty embodiment of the basic structure is designed to control water flow wherein greater head pressures are encountered. This heavy duty construction is similar to that already described but with heavier type aluminum in the frame and other components of the device. Also, a larger diameter pipe stub of annular or helical corrugation is integrally welded to the back plate. This embodiment is generally for use with pipe of over 24 inches in diameter. Another feature of this embodiment is the use of a security lock bar attached to the slide gate plate and mating with a complementary unit mounted on the main frame structure for use of a lock to prevent unwanted lowering or raising of the water gate by unauthorized persons. That is, once the gate has been properly adjusted, the device may be locked in place and no one can readjust the gate without authorization.

Another embodiment has a screw-type cam-lock mechanism which is actuated by a threaded rod which feeds through a rotatable nut mounted at the top of the frame and turned by a hand wheel structure of unique construction. The hand wheel may be quickly disengaged from the adjusting nut which also functions as a safety precaution to prevent unwanted adjustment of the water gate. Normally, the threaded rod non-rotatably raises and lowers due to the action of the wheel nut thereon, but when the water gate is to be locked in place a slight rotation of the rod by applying a wrench or the like to the upper end thereof will rotate same about 90 degrees to actuate the cam-lock mechanism. On all of these embodiments the movable parts are quickly and easily changed without removing the basic main frame structure as installed from the installation site.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a front elevational view of the device of this invention.

FIG. 2 is a side elevational view of the device of this invention.

FIG. 3 is a fragmentary portion, partly in cross section, taken generally along line 3—3 of FIG. 1 of the cam-lock mechanism.

FIG. 4 is a view from the top, partly in cross section, taken generally along line 4—4 of FIG. 1.

FIG. 5 is a modified embodiment of the handle and operating mechanism for the water gate and cam-lock mechanism.

FIG. 6 is a view partly in cross section, taken generally along line 6—6 of FIG. 5.

FIG. 7 is a view from the top, partly in cross section, taken generally along line 7—7 of FIG. 5.

FIG. 8 is another view from the top, partly in cross section, taken generally along line 8—8 of FIG. 5.

FIG. 9 is a cross sectional view taken through the center of the hand wheel connecting structure of the embodiment of FIGS. 5-8.

FIG. 10 is a perspective view of the control wheel connection assembly per se.

FIG. 11 is a front view of another embodiment of the invention.

FIG. 12 is a side elevational view, partly in cross section, of the embodiment of FIG. 11.

DESCRIPTION OF THE PREFERRED EMBODIMENT

Looking at FIG. 1 of the drawings reference numeral 10 indicates in general, the cam-lock water gate structure of this invention. The basic main frame of the device includes channel members 12 mounted parallel with respect to each other and in a substantially vertical position. A back plate 14 is integrally attached to the parallel channels preferably by welding. The welding 21 is preferably of one-quarter inch V-type, and since the preferred material for the channels, backing plate, and so forth, is of marine type aluminum alloy such welding rod material as normally used for this type material must be used. A top angle 16 is attached by removable stainless steel bolts 17 together with lock washers and lock nuts 19. This easily removable bolt attachment at the top of the channels 12 is one of the new and unique features of this device. Merely by removing the two bolts 17 at each of the top corners, the entire operating mechanism to be described below, may be quickly and easily lifted out of the channels 12 and the rest of the installed structure. This permits quick and easy replacement and/or repair of the operating mechanism without disturbing the basic installation of the structure.

The back plate 14 has an aperture 15 provided therein of the size desired for the application with which the structure is to be installed. In the normal or regular duty model, this would be from 6 to 24 inches in diameter, while in the heavy duty embodiment the structure and opening would generally be greater than 24 inches. Welded adjacent to and in alignment with opening 15 is a short stub of pipe of approximately 1 foot in length. This pipe stub is preferably of corrugated pipe, of either annular or helical spiral type, for the purpose of strength. This pipe also is preferably of aluminum alloy. A water gate slide plate 20 of appropriate size to be easily moved in the channels 12 is also provided. It also is of sufficient size to completely cover the opening 15 in the backing plate 14. A sealing gasket 22 is firmly attached by epoxy glue 23, pressure bonding or the like, to the back side of the slide water gate so as to surround and be adjacent to the water opening 15 when the gate is fully closed. This gasket is preferably of rubber, but may be of other resilient and liquid impervious material such as some of the newer plastics and the like. The purpose of the gasket seal 22 is to fill in any irregularities between the portion of the backing plate 14 adjacent the opening 15 therein and the surface irregularities in the slidable water gate plate 20, if there be any.

This embodiment also is provided with a security locking bar 24 attached by welding 21 to the outer surface of water gate slide plate 20. The security bar has a limit stop 23 welded thereon for preventing upward movement beyond this point, and apertures 25 provided at spaced intervals along the portion of the bar above the limit projection 23. These apertures 25 are for the purpose of mating with a complementary aperture 133 provided on a right angle member 33 welded to the top of angle iron 16. When the water gate slide plate 20 is adjusted to a partially opened or completely opened position, then a padlock 26 may be inserted through one of the apertures 25 in alignment with the aperture 133 in angle member 33 to lock the structure against further adjustment. Thus, unwanted adjustment of the device by unauthorized persons is prevented.

A control rod 30 provided with an operating handle 32 mounted in T-fashion at the top thereof is used for actuating the cam-lock mechanism of the device. This cam-lock structure may best be seen in cross section in FIG. 3 of the drawings. Another channel member having side walls 34 and a connecting wall 35 is attached by screws 40 to the gate plate 20. The screws 40 are preferably of stainless steel, tapered with flat heads, and are countersunk into the plate 20 by tapered holes 42 therewithin. Stainless steel lock washers and lock nuts 44 are also used to secure the channel 34, 35 to the gate 20. The lower end of the control rod 30 passes through suitable holes 130 in the channel sides 34. These holes are just slightly larger than the outer circumference of the rod 30 to permit easy rotation of said rod therewithin, but to prevent any great amount of side motion. The portion of the rod 30 between the channel sides 34 has welded thereto a cam member 31. When the rod 30 is rotated the cam member 31 will be forced against the inner side of the cam-lock bar 36. As best seen in FIG. 4, this cam-lock bar 36 will be forced outwardly with a bending deflection action at the mid-point thereof to secure the respective ends against the inner portions of the associated channels 12. Thus as can be visualized by looking at the respective views, by lifting on the control rod 30 and the security bar 24, the gate plate 20 may be moved into proper adjustment relative to the water flow aperture 15 of the overall structure, and when the desired degree of opening is achieved, the handle 32 is turned, thus rotating control rod 30 and cam member 31 thereon. After the cam member 31 wedges between the control rod 30 and the associated portion of the lock bar 36, the water gate plate 20 will be securely locked in the position as adjusted. The gasket seal 22 with the bonding 23 will normally function when the water gate 20 is fully closed and fully covering the opening 15.

FIGS. 5-10 show another embodiment of the invention wherein the control rod 30 and control handle 32 of T-configuration of the first embodiment is replaced with a control rod 50 having threads 150 thereupon. The lower unthreaded portion of the control rod 50 is mounted in channel sides 34' with back 35' appropriately secured to the water gate slide plate 20' by stainless steel recessed screws 40' and lock washers and lock nuts 44' as in the first embodiment. As best seen in FIG. 8, a short cam member 51 is secured by welding 21' to the lower portion of the control rod 50 and functions in a manner similar to cam member 31 of the first embodiment to move the locking bar 36' outwardly for a wedging action of the respective ends thereof against the channels 12.

FIG. 7 shows the mounting for the upper portion of control rod 50 as do FIGS. 9 and 10. The plate 60 is provided with a central aperture and recessed portion 61 for rotatably retaining in bearing like fashion a washer 71 welded to an adjusting nut 70. The plate 60 is appropriately attached to the upper side of angle member 16' by stainless steel bolts 62 and lock nuts 63 thereon. The threads inside the adjusting nut 70 appropriately complement the threads 150 on the outside of the control rod. Mounted by welding 73 to the other side of the adjusting nut 70 from that of washer 71 is a tubular member 74. This tubular member has an inside diameter larger than that of the end of control rod 50 and does not normally come into direct contact therewith. Provided in the upper portion of the tubular member 74 is an elongated slot 76. This slot 76 is for reception of a projecting member 78 provided on and extending inwardly of the hub 56 on the control wheel 52. As can be visualized by looking at FIGS. 9 and 10, when the control wheel 52, 54 is mounted upon the control rod 50 and adjusting nut 70, therefor, the projection 78 will form a driving connection with the slot 76 in member 74 so that the nut 70 will be rotated in either direction by rotation of the control wheel. Since the member 60 and washer 71 welded to the adjusting nut 70 maintain same in a set vertical position upon the angle bar 16', rotation of the nut through engagement of the screw threads 150 on control rod 50 will lift or lower said control rod 50 in a fine accurate manner. Thus, the control wheel 52 may be used to adjust the position of the water gate slide plate 20' as in the first embodiment, but with a greater degree of precision and accuracy.

Since the rotating adjusting nut 70 and washer 71 welded thereto function in a sense as a rotatable lifting bearing for the associated portion of the control rod 50, means for lubricating this member is also provided. Looking at FIG. 7, the lubrication channel 64 is shown drilled in the plate member 60 together with a grease fitting 66 appropriately screwed into the plate member and in alignment with said lubricating channel. With this lubrication provision adequate bearing grease may be applied to the recessed portion 61 and surrounding the washer 71.

FIG. 8 shows the cam-lock member 51 welded to the lower end of control rod 50 by welding 21'. This cam member 51 when rotated in the direction of the arrow in FIG. 8 will force the bar 36' outwardly so that the outer ends thereof will engage with the inner channels 12 to lock the water gate in the position as adjusted by the screw control rod. It should be noted that the screw control rod 50 normally does not rotate itself, but it is the adjusting nut 70 which rotates and lifts the relatively stationary control rod up and down. When the proper vertical adjustment has been made, then a wrench may be applied to the square portion 80 at the top of control rod 50 for rotating the rod 90° in order to move the cam portion 51 from the solid line position of FIG. 8 to the dotted line position of this figure. If desired, instead of directly engaging the square portion 80 of the control rod 50 by a wrench, a larger nut member 82 (FIG. 10) may be provided therefore having a square aperture 83 therewithin, which mates with the square projection 80 of the control rod, and a setscrew 84 for locking this nut member upon the upper end of the control rod. Obviously with this nut in place the control wheel 52 may not be removed until the nut member is first removed. This can best be visualized by looking at FIGS. 5 and 6 which show the nut member in place. The fact that the control wheel is removable from the overall structure once the proper adjustment of the gate has been made, is another important feature of this embodiment of the invention. Obviously, without the control wheel a change in the adjustment of the water gate cannot readily be made by unauthorized persons. This embodiment therefore has a built-in safety feature which eliminates the necessity for provision of a security lock bar similar to the one 24 of the first embodiment.

The last embodiment of the invention is shown in FIGS. 11 and 12, wherein a cam-lock water gate is shown for controlling water flow from a pond, field or canal, wherein the water head pressure is less than that of the previous two embodiments. Similar components to those already described are labelled with the same reference numerals having a double prime thereafter. The pipe stub is shown having a helical spiral 122". The control rod member in this version is of lighter and simpler construction than that of the previous embodiments. A simple control rod 90 having a right angle handle portion 92 is provided with a cam portion 91 welded thereto for engagement with the bar 36".

This light duty model of the invention is normally available is pipe sizes from 6 inches to 24 inches and is highly portable because of the lightweight construction thereof, and easily installed without the aid of heavy equipment. Again, special marine aluminum alloy is used for the frame, back plate and water gate slide plates together with stainless steel bolts, washers and nuts used to secure the components together, as well as aluminum welding. The hand operated cam-lock device insures constant pressure action of the slide plate against the back plate and the high quality resilient rubber gasket glued to either the back plate around the aperture or on the backside of the water gate slide plate, effects a watertight seal when the gate is completely closed and the cam-lock is operated. While the resilient gasket member may be pressure glued or epoxy bonded to either the back plate 14" or the water gate 20", for ease of replacement of the gasket it is preferable that the gasket be fastened to the backside of the water gate slide plate 20". This also applies to the previous two embodiments since one of the important features of all three embodiments is the fact that the basic frame structure may be installed and then all moving parts and control structure may be easily removed by just removing the two end bolts holding the upper frame member 16, 16' or 16".

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A water gate structure for the control of water flow, comprising:

a frame having an opening therein adapted for flow of water therethrough;

plate means mounted adjustably on the frame for controlling the flow of water through the opening;

actuating means carried by the frame and connecting to the plate means for adjusting the position of the plate means relative to the opening;

a lock bar movable relative to the frame and spaced from the plate means;

cam means disposed between the plate means and the lock bar, the cam means being actuable to contact facing portions of the lock bar, the lock bar acting in spring-like fashion to exert a force through the cam means against the plate means to lock the plate means in a given position relative to the opening;

mounting means joined to the plate means for mounting the lock bar for movement with the plate means relative to the frame and for mounting the actuating means, the mounting means transmitting force to the plate means from the lock bar through the actuating means and cam means connected to said actuating means;

wherein the cam means includes a cam member affixed to the control rod, and said control rod is mounted vertically with the cam member adjacent the lock bar for wedging action thereof when the control rod is actuated to a locking position; and wherein the control rod is provided with screw threads thereon, and an adjusting nut is mounted on the frame for lifting and lowering said threaded control rod when said adjusting nut is rotated in one direction or the other.

2. The structure set forth in claim 1, wherein the adjusting nut functions as a bearing member and is mounted on the frame with a lubrication grease fitting structure.

3. The structure set forth in claim 2, together with removable hand wheel structure for association with the adjustable threaded nut so that when the hand wheel is removed unauthorized persons may not adjust the mechanism.

4. The structure of claim 1 wherein the frame comprises two channel members vertically mounted in parallel relation, a back plate affixed to the two channel members and extending therebetween, the back plate having the opening formed therein, the plate means being slidably mounted between the two channel members, and the lock bar being movable relative to the two channel members, each end of the lock bar tensionably contacting surfaces of each of the channel members on contact between the cam means and the lock bar caused by actuation of the cam means.

5. The structure set forth in claim 4, together with a resilient sealing gasket between the back plate with water opening therein and the plate means for forming a watertight seal when the plate means is in the fully closed position and the cam means is actuated.

6. The structure of claim 4 wherein the frame further comprises a top rail removably mounted to the upper ends of the vertical channel members.

7. The structure of claim 1 wherein the frame comprises a back plate having the opening formed therein, the structure further comprising a section of connecting pipe attached to the back plate and in alignment with the opening, guide channels provided on that side of the back plate opposite the section of connecting pipe, the plate means being slidably mounted in said guide channels.

8. The structure of claim 7 wherein the adjusting means includes a bar member for positioning the plate means relative to the opening in the back plate, the lock bar being disposed between the guide channels, the cam means being actuated by the control rod.

* * * * *